(12) United States Patent
Mahajan (10) Patent No.: US 8,497,981 B2
(45) Date of Patent: Jul. 30, 2013

(54) SMALL FORM-FACTOR SIZE SENSOR (75) Inventor: Manish Mahajan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 691 days.

(21) Appl. No.: 12/560,162

(22) Filed: Sep. 15, 2009

(65) Prior Publication Data

US 2011/0061251 A1    Mar. 17, 2011

(51) Int. Cl.
 *G01C 3/08* (2006.01)
(52) U.S. Cl.
 USPC ............ 356/3.01; 356/3.1; 356/4.01; 356/4.1
(58) Field of Classification Search
 USPC ............ 356/3.01–3.15, 4.01–4.1, 5.01–5.15, 356/6–22, 28, 28.5, 139.01–139.1
 See application file for complete search history.

(56) References Cited

U.S. PATENT DOCUMENTS

| | | | |
|---|---|---|---|
| 3,010,019 A | 11/1961 | Sohst | |
| 3,194,108 A | 7/1965 | Gunther | |
| 3,530,468 A | 9/1970 | Hannan | |
| 4,484,069 A | 11/1984 | Brenholdt | |
| 5,198,877 A | 3/1993 | Schulz | |
| 5,487,669 A * | 1/1996 | Kelk | 434/112 |
| 5,903,235 A | 5/1999 | Nichols | |
| 7,012,738 B1 | 3/2006 | Schwarte | |
| 7,130,034 B2 | 10/2006 | Barvosa-Carter et al. | |
| 7,180,607 B2 | 2/2007 | Kyle et al. | |
| 7,225,548 B2 | 6/2007 | Sieracki et al. | |
| 7,285,793 B2 | 10/2007 | Husted | |
| 2002/0145724 A1 | 10/2002 | Wursch et al. | |
| 2003/0098973 A1 | 5/2003 | Schmidt et al. | |
| 2005/0035314 A1 | 2/2005 | Yamaguchi | |
| 2006/0201006 A1 | 9/2006 | Burlingham et al. | |
| 2007/0121096 A1 | 5/2007 | Giger et al. | |
| 2007/0237424 A1 | 10/2007 | Burg et al. | |
| 2008/0088817 A1 | 4/2008 | Skultety-Betz et al. | |
| 2011/0066399 A1 | 3/2011 | Mahajan | |

FOREIGN PATENT DOCUMENTS

| | | |
|---|---|---|
| DE | 19836812 A1 | 2/2000 |
| DE | 102005048013 A1 | 4/2007 |
| EP | 1008831 A1 | 6/2000 |
| WO | WO03062744 A1 | 7/2003 |
| WO | WO2008003436 A1 | 1/2008 |

OTHER PUBLICATIONS

International Search Report and Written Opinion—PCT/US2010/048979, International Search Authority—European Patent Office—Mar. 2, 2011.

* cited by examiner

*Primary Examiner* — Luke Ratcliffe
(74) *Attorney, Agent, or Firm* — Liberty E. Mann (57) ABSTRACT

The subject matter disclosed herein relates to determining a distance from a mobile device to a remote object or a size of the remote object.

31 Claims, 7 Drawing Sheets

SMALL FORM-FACTOR SIZE SENSOR

BACKGROUND

1. Field

The subject matter disclosed herein relates to determining a distance from a mobile device to a remote object or a size of the remote object.

2. Information

Handheld devices such as a cell phone, a personal digital assistant (PDA), or the like continue to increase in popularity. Such devices, which may include a digital camera, may photograph an object to be viewed at a later time. An ability to determine a size of such an object represented by an image included in a photograph may be desirable.

BRIEF DESCRIPTION OF THE FIGURES

Non-limiting and non-exhaustive features will be described with reference to the following figures, wherein like reference numerals refer to like parts throughout the various figures.

SUMMARY

In one particular implementation, a method comprises positioning an aperture through which to view a first point on a surface; adjusting an angle of rotation of a micro-reflector located a first distance from the aperture to direct energy toward the first point; and calculating a distance to the surface using at least values of the first distance and the angle. It should be understood, however, that this is merely an example implementation and that claimed subject matter is not limited to this particular implementation.

DETAILED DESCRIPTION

Reference throughout this specification to "one example", "one feature", "an example" or "a feature" means that a particular feature, structure, or characteristic described in connection with the feature and/or example is included in at least one feature and/or example of claimed subject matter. Thus, the appearances of the phrase "in one example", "an example", "in one feature" or "a feature" in various places throughout this specification are not necessarily all referring to the same feature and/or example. Furthermore, the particular features, structures, or characteristics may be combined in one or more examples and/or features.

In an implementation, a handheld device, such as a cellular phone, a personalized digital assistant (PDA), a camera, or the like, may include a size sensor to determine a size of a remote surface or a portion thereof. Here, a remote surface may refer to a surface of an object some distance away from a handheld device. Such a size sensor may comprise a viewfinder and/or aperture to view a point on a remote surface, an emitter to emit light, infrared (IR) energy, and/or radio frequency (RF) energy to the remote surface, and/or a special purpose processor adapted to determine a distance to the viewed point on the remote surface. Here, a distance may be determined without using RADAR or SONAR techniques, for example. Accordingly, a handheld device need not include receiver and/or timer electronics typically associated with such techniques. A special purpose processor may use such a determined distance to calculate a size of at least a portion of a remote surface, as explained below. Additionally, such a size sensor may have a sufficiently small form factor in order to fit in a handheld device such as a cellular phone or PDA, for example. Such a small form factor may provide portability and convenience to a user, or may allow a size sensor to be packaged or integrated with another device having a different functionality than measuring, such as communication or photography, for example.

In a particular implementation, a handheld device may include a size sensor including an emitter capable of emitting light, IR and/or RF energy to a surface of a remote surface along multiple angles with respect to the handheld device, for example. A particular angle may correspond to emitted energy falling on a point of the remote surface that is also centered in a viewfinder of the handheld device. In such a case, which will be explained in greater detail below, a distance to the remote surface may be determined using, for example, one or more trigonometric relationships involving an emission angle and a distance between the viewfinder and the emitter within the handheld device. Using the determined distance to the remote surface, a size of at least a portion of the remote surface may then be determined. Of course, such a process of determining a size or distance is merely an example, and claimed subject matter is not so limited.

Figure 1:
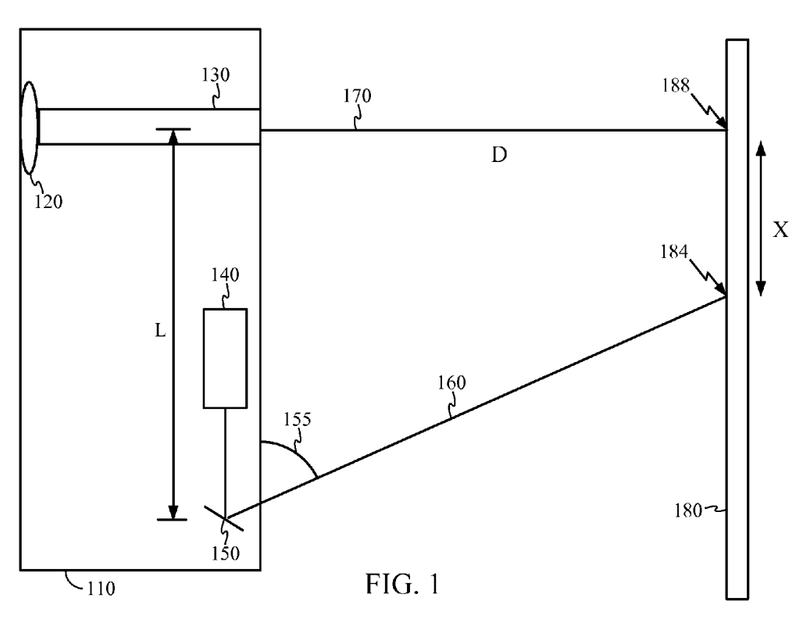
FIG. 1 is a schematic diagram showing a device to measure a size of an object, according to an implementation.

FIG. 1 is a schematic diagram showing a device 110 to measure a size of a remote surface 180, according to an implementation. Such a device may comprise a handheld, portable device such as a cellular phone, a PDA, and/or a digital camera, for example, as mentioned above. Device 110 may include a viewfinder 120, an aperture 130, an emitter 140, and/or a rotatable reflector 150. Viewfinder 120 may comprise a display including a liquid crystal display (LCD), a plasma display, and/or a cathode ray tube (CRT) display, for example. Viewfinder 120 may receive electronic signals from light-sensitive devices, such as complimentary metal oxide semiconductor (CMOS) devices and/or charged coupled devices (CCD's) disposed in a portion of aperture 130, for example. Aperture 130 may comprise collimated optical elements, such as lenses and/or mirrors, to result in an image of at least a portion of a remote surface, substantially centered at point 188, being displayed in viewfinder 120, for example. Such a portion of a remote surface may be centered along a line-of-sight 170 determined by aperture 130, for example.

In an implementation, device 110 may have a scaling factor based at least in part on a particular configuration of aperture 130. For example, properties of optical elements included in aperture 130 may determine a degree of magnification of an image that is displayed in viewfinder 120 and/or a photograph taken by device 110, among other possibilities. Such a scaling factor may be established upon or after a design and/or construction of device 110, wherein optical elements and/or imaging electronics determine, at least in part, such a scaling factor. In a particular implementation, device 110 may have a variable scaling factor that varies as a lens magnification changes, such as in the case of a zoom lens, for example. If such a scaling factor is known, then a size of an object displayed in viewfinder 120 may be determined by applying the scaling factor to a calculation based at least in part on an image of the object displayed in viewfinder 120 and/or a photograph. Such a calculation may further involve a distance from device 110 to the object, such as distance D to remote surface 180, for example. Accordingly, a process to determine a size of an object may include first determining a distance to the object, as described in detail below.

Emitter 140 may comprise a laser diode, a light emitting diode (LED), or other light source that may be collimated using optical elements, for example, to direct energy to rotatable reflector 150. Here, though the term "light" is used, emitter 140 may emit a variety of forms of electromagnetic (EM) energy comprising RF radiation, ultraviolet (UV), and/or IR wavelengths, for example. In a particular implementation, emitter 140 may emit pulsed energy, e.g., a relatively short wave-train of EM energy having a beginning and ending time. Such a pulse may be encoded, for example, to provide a means for distinguishing multiple pulses from one another. Of course, such descriptions of energy are merely examples, and claimed subject matter is not so limited.

Rotatable reflector 150 may comprise a mechanically rotatable reflector capable of directing light, IR, UV, and/or RF energy along variable angles toward a surface, such as remote surface 180, for example. Such a rotatable reflector may comprise a micro-reflector device, such as a micromirror array mounted on a semiconductor device, also known as a digital mirror device, for example. Depending on what type of energy is to be reflected, such a rotatable reflector may include various coatings and/or treatment to improve reflectance. Such a rotatable reflector may also include various reflecting-surface shapes, such as planar, spherical, parabolic, concave, convex, and so on. Such a rotatable reflector may have a relatively small form factor, allowing the rotatable reflector, among other things, to fit in a handheld device, such as device 110, for example. Of course, such a micro-reflector device is merely an example of a small form factor rotatable reflector, and claimed subject matter is not so limited. Rotatable reflector 150 may be disposed in device 110 so that light from emitter 140 is reflected at a point on rotatable reflector 150 that is spaced a distance L away from an axis of aperture 130. Such a particular separation may be useful to determine a distance from device 110 to a remote surface, as explained in detail below.

Figure 2:
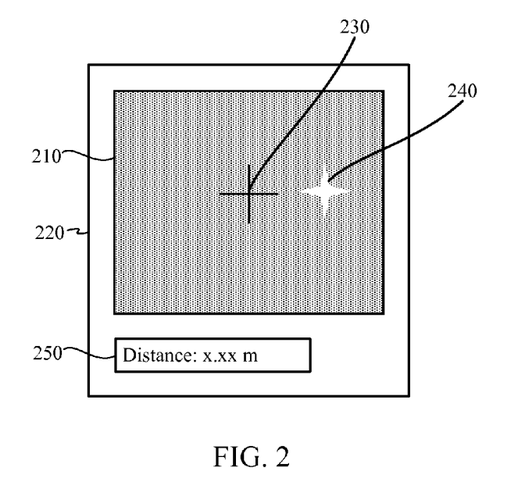
FIG. 2 is a schematic diagram showing an image in a viewfinder, according to an implementation.

FIG. 2 is a schematic diagram showing an image 210 in a viewfinder 220, according to an implementation. Device 110 shown in FIG. 1, for example, may include such a viewfinder and image 210 may comprise an image of at least a portion of remote surface 180. Viewfinder 220 may include crosshairs 230, which may be substantially centered in viewfinder 220. Crosshairs 230 may correspond to point 188 on a remote surface 180. Also shown in FIG. 2 is an image of a portion of remote surface 180 that includes a spot 240 produced by device 110, for example. In particular, referring again to FIG. 1, spot 240 may be produced by energy beam 160 emitted at an angle 155 from device 110 via rotatable reflector 150. In such a case, spot 240 may comprise point 184 on remote surface 180, as shown in FIG. 1. Viewfinder 220 may also include a distance indicator 250, which will be described in further detail below. Spot 240 may comprise a spot of light scattered from remote surface 180 so that it is visible to a user via viewfinder 120, for example. Such a spot may have various sizes and/or shapes, including a circular spot, a square spot, a star-shaped spot, and so on. Spot size may have a width or diameter of approximately several millimeters or centimeters, for example. In one implementation, brightness, spot size and/or shape may be user-selectable so that such a spot on a remote surface is relatively easily viewable in a viewfinder. Accordingly, spot size and/or brightness may be increased if viewing (and measuring) remote surfaces that a relatively far away from the user. Brightness, size and/or shape of a spot may be varied by changing emission intensity of emitter 140, and changing characteristics of collimating optics of the emitter, respectively, though claimed subject matter is not so limited.

In a particular implementation, viewfinder 220 may display spot 240 whether or not spot 240 comprises visible light. For example, if energy beam 160 comprises visible light, then spot 240 may comprise a spot that is visible to a user with or without viewfinder 220. On the other hand, if energy beam 160 comprises IR or other RF energy, then spot 240 may comprise a spot that is not visible to the naked eye, but viewfinder 220 may nevertheless display spot 240 to a user. This may be possible since energy-receiving devices, such as CMOS devices or CCD's may be sensitive to RF energy that is not visible to a user; electronic signals from such devices may be used by viewfinder 220 to display otherwise invisible RF energy, for example. In another particular implementation, viewfinder 220 may display spot 240 continuously whether or not spot 240 comprises pulsed light. For example, if energy beam 160 comprises pulsed energy, as mentioned above, then spot 240 may comprise a flashing spot, which may be undesirable to a user. However, viewfinder 220 may nevertheless display spot 240 continuously, without such flashing, for example. This may be possible since electronics for viewfinder 220 may involve a time constant that is too slow to react to each off/on cycle of such a flashing spot, for example. Accordingly, spot 240 may appear to be continuously on. Of course, such a time constant and other aspects of such electronics are merely examples, and claimed subject matter is not so limited.

Returning to FIG. 1, a user may adjust rotation of rotatable mirror 150 in order to direct emitted light onto remote surface 180 in a way so that point 184 substantially overlaps with point 188. In FIG. 1, for example, point 184 is not overlapping with point 188, since points 184 and 188 are separated by a distance X, as shown in the figure. Such a separation is also displayed in viewfinder 220, shown in FIG. 2, which shows crosshairs 230 separated from spot 240. Accordingly, as indicated above, a user may adjust rotation of rotatable mirror 150 in order to move spot 240 towards point 188 until spot 240 substantially overlaps with point 188. Such an adjustment may be performed using various input devices (not shown), such a buttons, dials, a touch screen, and voice commands, just to name a few examples. Of course, such mirror adjustment is merely an example, and claimed subject matter is not so limited.

Figure 3:
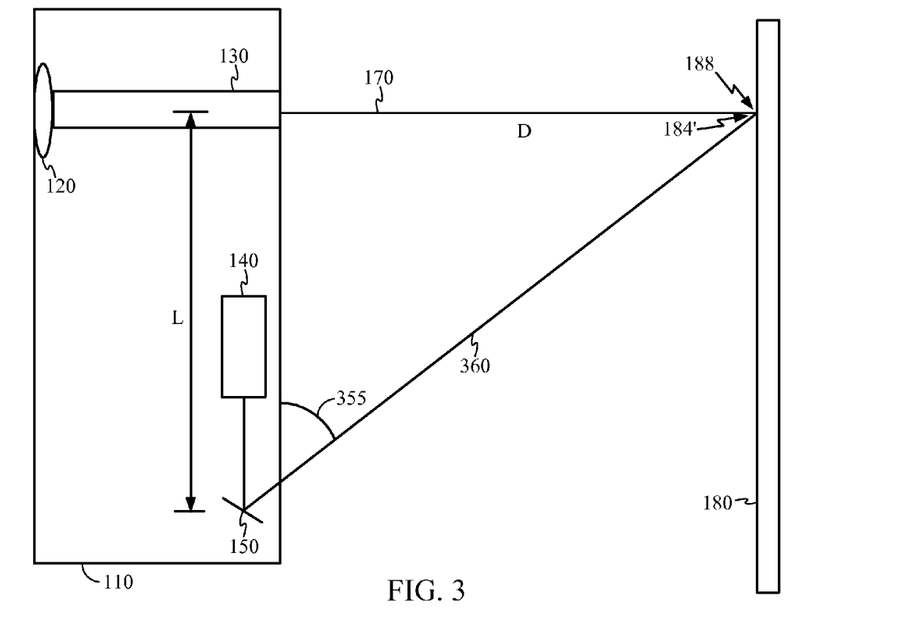
FIG. 3 is a schematic diagram showing a device to measure a size of an object, according to an implementation.
Figure 4:
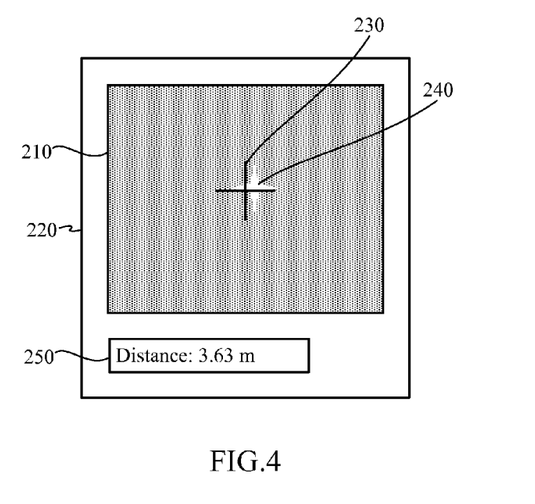
FIG. 4 is a schematic diagram showing an image in a viewfinder, according to an implementation.

FIG. 3 is a schematic diagram showing device 110, wherein rotatable reflector 150 is adjusted to an angle 355 so that directed energy 360 produces a spot 240 at point 184' substantially overlapping with point 188 on remote surface 180. Such a substantial overlap may be indicated in viewfinder 220, as shown in FIG. 4, for example. Here, spot 240 substantially coincides with the position of crosshairs 230. In such a condition, wherein spot 240 substantially overlaps crosshairs 230, a distance from device 110 to remote surface 180 may be determined using angle 355 and spacing L, as described above. For example, a distance D from device 110 to remote surface 180 may be substantially equal to the product of L and the tangent of the value of angle 355. In a particular implementation, a result of determining distance D may be displayed in distance indicator 250, for example. In another particular implementation, a distance D may be stored and associated with a photograph, for example, taken substantially at the time that distance D was determined. Such a stored associated distance may subsequently be used to measure sizes and/or dimensions of objects included in a photograph, as explained below.

Figure 5:
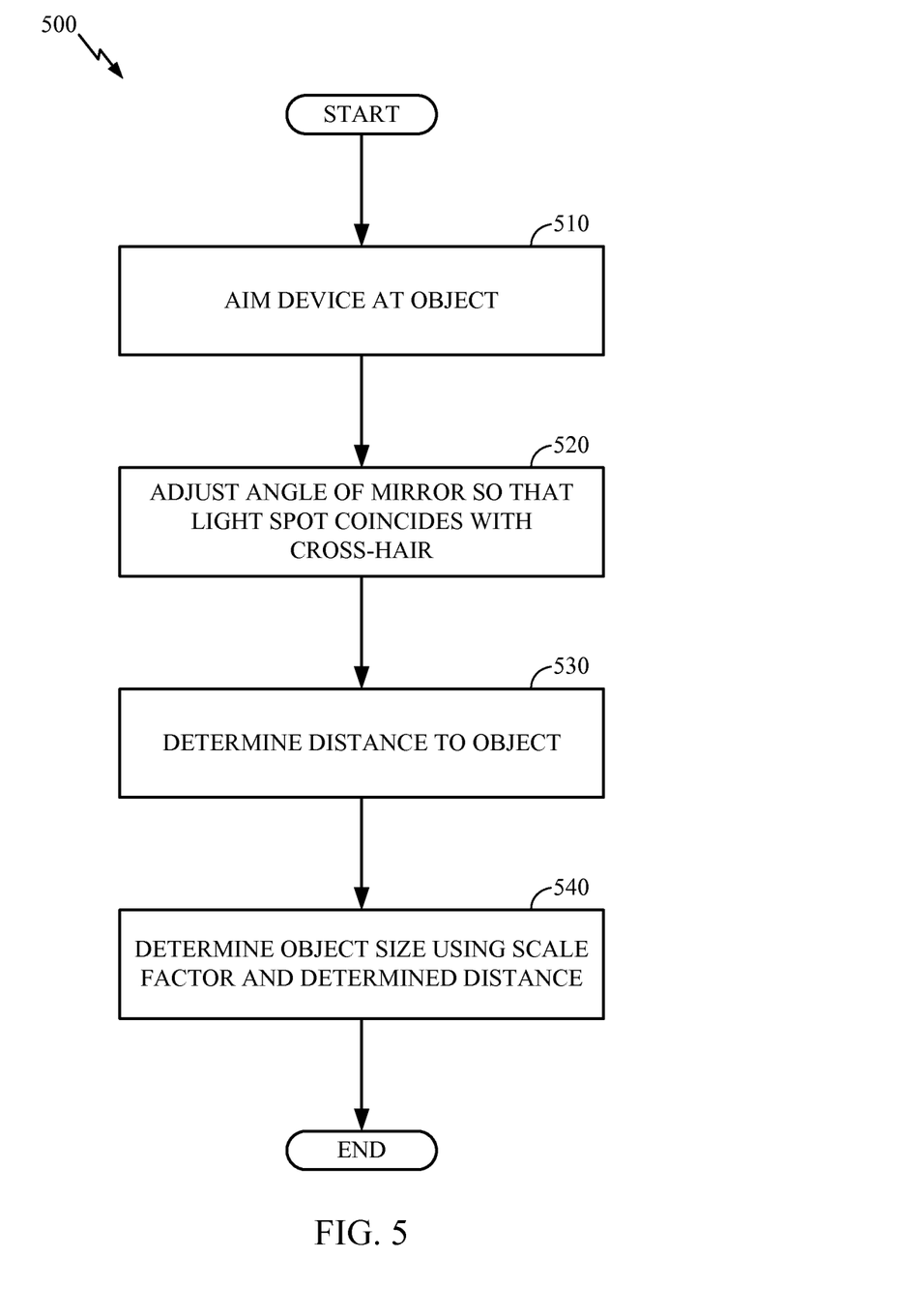
FIG. 5 is a flow diagram of a process for determining a size of an object, according to an implementation.

FIG. 5 is a flow diagram of a process 500 for determining a size of an object, according to an implementation. As described above, a device, such as device 110 shown in FIG. 1, may include a size sensor to determine a size of at least a portion of a remote surface. Such a remote surface may comprise a surface (facing the device) of a remote object so that determining a size of the remote surface may be equivalent to determining a size of the remote object, for example. At block 510, a user may position a handheld device, such as device 110 shown in FIG. 1, so that a portion of a remote object is viewed behind crosshairs 230 in viewfinder 220. At this time, a rotatable mirror, such as rotatable mirror 150, probably will not be adjusted to a desirable angle such that a spot 240 overlaps crosshairs 230, for example. Accordingly, a user may adjust rotatable mirror 150 so that such an overlap does occur, as at block 520. As explained above, such an overlapping condition provides an opportunity to determine a distance from device 110 to the remote object using, for example a trigonometric relation. If such a distance is determined, as at block 530, an object size may then be determined using the distance and a scale factor of the device, as explained above, as at block 540.

Figure 6:
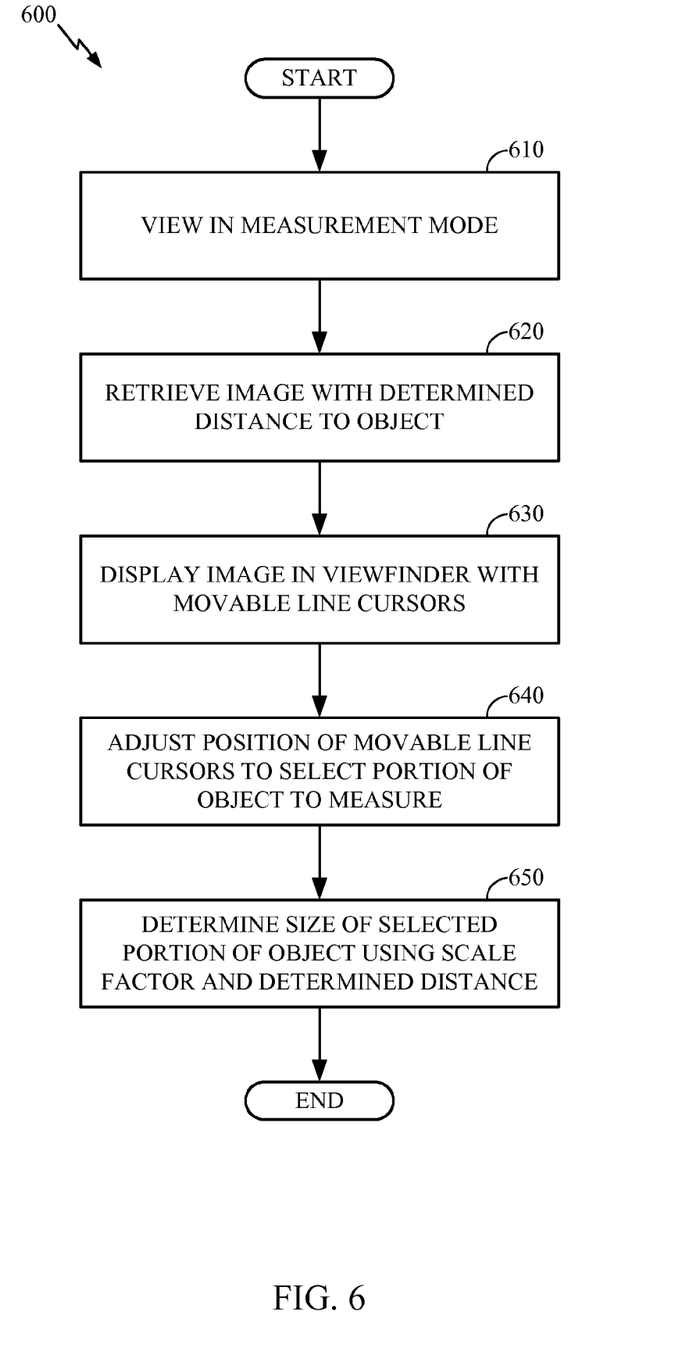
FIG. 6 is a flow diagram of a process for determining a size of an object, according to another implementation.
Figure 7:
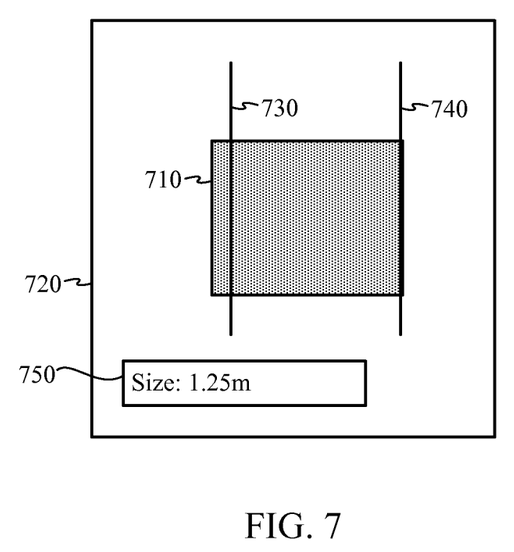
FIG. 7 is a schematic diagram showing an image in a viewfinder during a process for determining a size of an object, according to an implementation.
Figure 8:
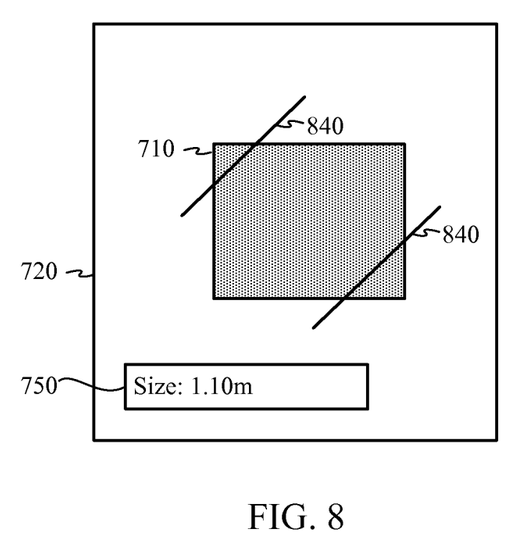
FIG. 8 is a schematic diagram showing an image in a viewfinder during a process for determining a size of an object, according to another implementation.

FIG. 6 is a flow diagram of a process 600 for determining a size of an object using a device, such as device 110 shown in FIG. 1, according to an implementation. FIG. 7 is a schematic diagram showing an image 710 in a viewfinder 720 during process 600 for determining a size of an object, according to one implementation, and FIG. 8 is a schematic diagram showing image 710 in viewfinder 720 during process 600, according to another implementation. Process 600 may include viewing a displayed image 710 of an object in viewfinder 720, as at block 610. Such a displayed image may comprise a photograph, or a portion thereof, taken at an earlier time and stored in a memory, for example. At block 620, such an image may be retrieved from a memory along with an associated determined distance to an object in the image, as indicated above. At block 630, viewfinder 720 may display an image in a measurement mode, wherein such a display includes user-adjustable line cursors to measure sizes and/or dimensions of objects in an image, as explained below. For example, FIG. 7 shows line cursors 730 and 740 that may be moved to various positions superimposed on image 710 of an object. Accordingly, as at block 640, a user may adjust a position of line cursors 730 and/or 740 to coincide with portions of image 710 of which the user desires to measure the size and/or dimensions. Using a scaling factor associated with device 110, size and/or dimensions of a portion of image 710 may be determined based, at least in part, on a spacing between line cursors 730 and 740.

In a particular implementation, viewfinder 720 may include size indicator 750 to display a calculated size of a portion of an object included in image 710 selected by line cursors 730 and 740, for example. Such a size indicator may be updated continuously or from time to time as positions of line cursors 730 and 740 are adjusted, for example.

In another particular implementation, viewfinder 720 may include line cursors 830 and 840 that may be rotatable as a pair. For example, a user may adjust a position of line cursors 730 and 740, as described for FIG. 7, and also adjust a rotation of such line cursors, resulting in line cursors 830 and 840 as shown in FIG. 8, for example. Such an ability of a user to rotate line cursors may be useful to select particular portions of an image for measuring size and/or dimensions thereof.

Figure 9:
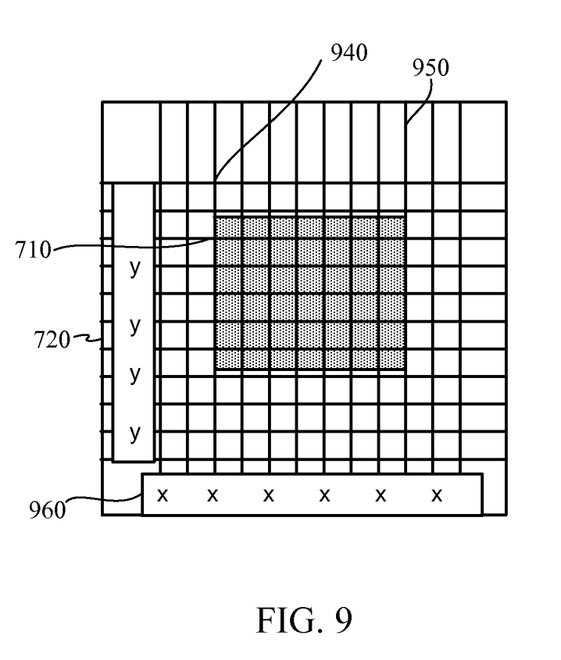
FIG. 9 is a schematic diagram showing an image in a viewfinder during a process for determining a size of an object, according to yet another implementation.

In another implementation, as shown in FIG. 9 for example, viewfinder 720 may comprise a display mode to display horizontal gridlines 940 and vertical gridlines 950 superimposed onto a displayed image 710 of at least a portion of a remote object. Such gridlines may be spaced to correspond to a determined size of the remote object. Using such gridlines, a user may determine sizes and/or dimensions of various portions of a remote object represented by image 710. Viewfinder 720 may also display scale fields 960 that may include numbers, for example, to show the scale of gridlines 940 and 950. In yet another implementation, a picture file comprising image 710, for example, may be stored with information representing associated gridlines and/or an associated scale. Such a picture file and associated information may be shared among multiple users for example. Of course, such gridlines are merely examples, and claimed subject matter is not so limited.

Figure 10:
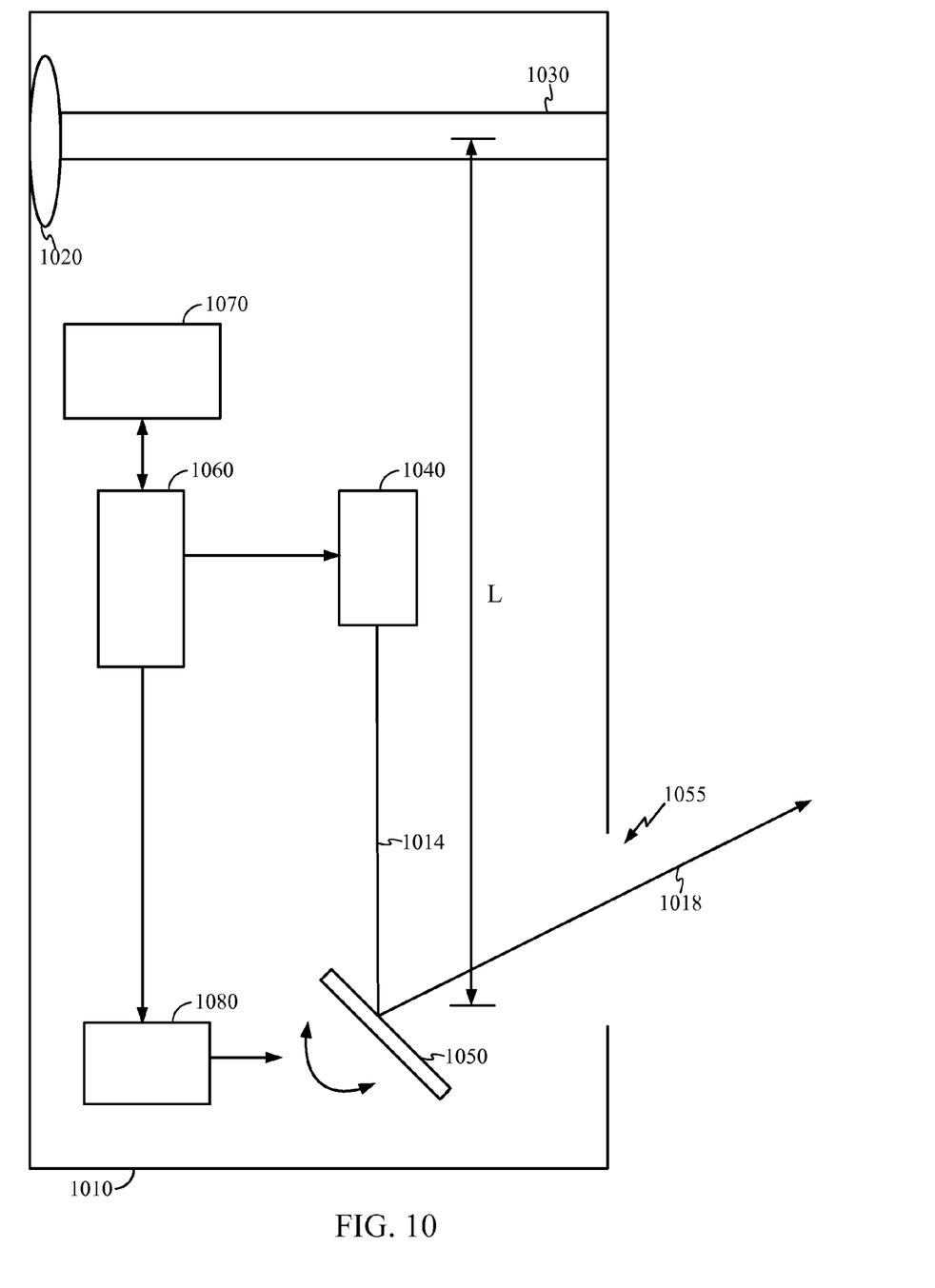
FIG. 10 is a schematic diagram showing a device to measure a size of an object, according to an implementation.

FIG. 10 is a schematic diagram showing a device 1010 to measure a size of an object, according to an implementation. Similar to device 110 shown in FIG. 1, for example, device 1010 may comprise a handheld, portable device such as a cellular phone, a PDA, and/or a camera, for example. Device 1010 may include a viewfinder 1020, an aperture 1030, an emitter 1040, and/or a rotatable reflector 1050. Viewfinder 1020 may comprise a display including a liquid crystal display (LCD), a plasma display, and/or a cathode ray tube (CRT) display, for example. Viewfinder 1020 may receive electronic signals from light-sensitive devices (not shown), such as CMOS devices and/or CCD's disposed in a portion of aperture 1030, for example. Aperture 1030 may comprise collimated optical elements, such as lenses and/or mirrors, to result in an image of at least a portion of a remote surface being displayed in viewfinder 1020, for example. Upon receiving emitted energy 1014 from emitter 1040, rotatable reflector 1050 may direct energy 1018 via opening 1055 toward a remote surface, such as remote surface 180 shown in FIG. 1, for example.

A processor 1060 may transmit information to a rotation controller 1080 that may send signals to rotatable reflector 1050 that determine at least in part the angular position of the rotatable reflector. In one particular implementation, rotatable reflector 1050 may comprise a reflector to reflect EM energy emitted by emitter 1040. Such a reflector may be rotated by a stepper motor that receives signals from rotation controller 1080, for example. In another particular implementation, rotatable reflector 1050 may comprise a micro-reflector array to reflect EM energy emitted by emitter 1040. The angle of reflection of such an array may be determined at least in part by signals from rotation controller 1080 that operate on multiple micro-reflectors in the array, for example. Rotation controller 1080 may operate on such an array of micro-reflectors in unison so that multiple micro-reflectors have identical reflecting angles, though individual micro-reflectors may also have reflecting angles different from one another. Of course, such emitters and reflectors are merely examples, and claimed subject matter is not so limited. User input 1070 may provide user access and/or control to rotation controller 1080 via processor 1060. Such user input may comprise hard and/or soft navigation keys/buttons, a touchpad, voice activation, a point-and-select tool, and so on. Using such a user input, a user may adjust an angle of rotatable reflector 1050 (via rotation controller 1080) to direct energy, such a laser light, to a particular point on a remote surface, as described above.

Methodologies described herein may be implemented by various means depending upon applications according to particular features and/or examples. For example, such methodologies may be implemented in hardware, firmware, software, and/or combinations thereof. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, or other devices designed to perform the functions described herein, and/or combinations thereof.

For a firmware and/or software implementation, methodologies may be implemented with modules (e.g., procedures, functions, and so on) that perform the functions described herein. Any machine-readable medium tangibly embodying instructions may be used in implementing the methodologies described herein. For example, software codes that represent electronic signals, and vise versa, such as digital electronic signals, may be stored in a memory, for example the memory of a mobile device, and executed by a specialized processor, such as processor 1060 shown in FIG. 10. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored.

In one or more exemplary embodiments, the functions described may be implemented in hardware, software, firmware, or any combination thereof. If implemented in software, the functions may be stored as one or more instructions or code that represent signals on a computer-readable medium. Computer-readable media includes physical computer storage media. Transmission media includes physical transmission media. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of appended claims, and equivalents thereof.

What is claimed is:

1. A method comprising:
    positioning an aperture through which to view a first point on a surface;
    adjusting an angle of rotation of a micro-reflector located a first distance from said aperture to direct energy toward said first point;
    calculating a distance to said surface using at least values of said first distance and said angle;
    determining a scaling factor of a mobile device, wherein said scaling factor is based at least in part on optical properties of said aperture; and
    determining a distance between two points on said surface using said scaling factor and said distance to said surface, wherein said determining said distance between two points on said surface further comprises:
        placing a scale on a display at said mobile device, said scale based at least in part on said scaling factor and said distance to said surface; and
        comparing said scale with an image of said surface to determine said distance between said two points on said surface.

2. The method of claim 1, wherein said adjusting said angle of rotation of said micro-reflector further comprising:
    adjusting said angle of rotation of said micro-reflector to direct energy toward a second point; and
    further adjusting said angle of rotation of said micro-reflector to change a position of said second point to substantially overlap said first point.

3. The method of claim 1, wherein said image comprises at least a portion of a digital photo.

4. The method of claim 1, wherein said determining said distance between two points on said surface further comprises:
    placing one or more marks on a display that includes an image of said two points on said surface;
    adjusting a position of said one or more marks on said display so that said position of said one or more marks on said display coincides with said two points of said image; and
    calculating said distance between said two points on said surface by using said scaling factor, said distance to said surface, and said position of said one or more marks.

5. The method of claim 4, wherein said image comprises at least a portion of a digital photo.

6. The method of claim 2, wherein said further adjusting is based at least in part on visually locating said second point through said aperture while performing said further adjusting.

7. The method of claim 1, wherein said angle of rotation is relative to a mobile device in which said micro-reflector is disposed.

8. The method of claim 7, further comprising:
    selecting user controls at said mobile device to rotate said micro-reflector.

9. The method of claim 2, wherein said further adjusting said angle of rotation is performed by selecting user controls at a mobile device.

10. The method of claim 1, wherein said energy comprises light waves.

11. The method of claim 2, wherein said micro-reflector is mounted on a semiconductor device.

12. The method of claim 3, further comprising:
    storing said digital photo with data associated with said scale in a picture file.

13. An apparatus comprising:
   means for positioning an aperture through which to view a first point on a surface;
   means for adjusting an angle of rotation of a micro-reflector located a first distance from said aperture to direct energy toward said first point;
   means for calculating a distance to said surface using at least values of said first distance and said angle;
   means for determining a scaling factor for a mobile device, wherein said scaling factor is based at least in part on optical properties of said aperture; and
   means for determining a distance between two points on said surface using said scaling factor and said distance to said surface, wherein said means for determining said distance between two points on said surface further comprises:
      means for placing a scale on a display at said mobile device, said scale based at least in part on said scaling factor and said distance to said surface; and
      means for comparing said scale with an image of said surface to determine said distance between said two points on said surface.

14. The apparatus of claim 13, wherein said means for adjusting said angle of rotation of said micro-reflector further comprising:
   means for adjusting said angle of rotation of said micro-reflector to direct energy toward a second point; and
   means for further adjusting said angle of rotation of said micro-reflector to change a position of said second point to substantially overlap said first point.

15. The apparatus of claim 13, wherein said image comprises at least a portion of a digital photo.

16. The apparatus of claim 13, wherein said means for determining said distance between two points on said surface further comprises:
   means for placing one or more marks on a display that includes an image of said two points on said surface;
   means for adjusting a position of said one or more marks on said display so that said position of said one or more marks on said display coincides with said two points of said image; and
   means for calculating said distance between said two points on said surface by using said scaling factor, said distance to said surface, and said position of said one or more marks.

17. The apparatus of claim 16, wherein said image comprises at least a portion of a digital photo.

18. The apparatus of claim 14, wherein said means for further adjusting is based at least in part on visually locating said second point through said aperture while performing said further adjusting.

19. The apparatus of claim 13, wherein said angle of rotation is relative to a mobile device in which said micro-reflector is disposed.

20. The apparatus of claim 19, further comprising:
   means for selecting user controls at said mobile device to rotate said micro-reflector.

21. The apparatus of claim 13, wherein said energy comprises light waves.

22. The apparatus of claim 14, wherein said micro-reflector is mounted on a semiconductor device.

23. The apparatus of claim 15, further comprising:
   storing said digital photo with data associated with said scale in a picture file.

24. An article comprising:
   a storage medium comprising machine-readable instructions stored thereon which, if executed by a computing platform, are adapted to enable said computing platform to:
   position an aperture through which to view a first point on a surface;
   adjust an angle of rotation of a micro-reflector located a first distance from said aperture to direct energy toward said first point;
   calculate a distance to said surface using at least values of said first distance and said angle;
   determine a scaling factor for a mobile device, wherein said scaling factor is based at least in part on optical properties of said aperture; and
   determine a distance between two points on said surface using said scaling factor and said distance to said surface, wherein said instructions, if executed by said computing platform, are further adapted to enable said computing platform to:
      place a scale on a display at said mobile device, said scale based at least in part on said scaling factor and said distance to said surface; and
      compare said scale with an image of said surface to determine said distance between said two points on said surface.

25. The article of claim 24, wherein said instructions, if executed by said computing platform, are further adapted to enable said computing platform to:
   adjust said angle of rotation of said micro-reflector to direct energy toward a second point; and
   further adjust said angle of rotation of said micro-reflector to change a position of said second point to substantially overlap said first point.

26. The article of claim 24, wherein said image comprises at least a portion of a digital photo.

27. The article of claim 24, wherein said instructions, if executed by said computing platform, are further adapted to enable said computing platform to:
   place one or more marks on a display that includes an image of said two points on said surface;
   adjust a position of said one or more marks on said display so that said position of said one or more marks on said display coincides with said two points of said image; and
   calculate said distance between said two points on said surface by using said scaling factor, said distance to said surface, and said position of said one or more marks.

28. The article of claim 24, wherein said angle of rotation is relative to a mobile device in which said micro-reflector is disposed.

29. The article of claim 24, wherein said energy comprises light waves.

30. The article of claim 25, wherein said micro-reflector is mounted on a semiconductor device.

31. The article of claim 26, further comprising:
   storing said digital photo with data associated with said scale in a picture file.

* * * * *